United States Patent [19]

Ariyavisitakul et al.

[11] Patent Number: 5,222,101
[45] Date of Patent: Jun. 22, 1993

[54] PHASE EQUALIZER FOR TDMA PORTABLE RADIO SYSTEMS

[75] Inventors: Sirikiat Ariyavisitakul, Eatontown; Hamilton W. Arnold, Middletown, both of N.J.

[73] Assignee: Bell Communications Research, Livingston, N.J.

[21] Appl. No.: 695,524

[22] Filed: May 3, 1991

[51] Int. Cl.⁵ .............................................. H03H 7/30
[52] U.S. Cl. ....................................... 375/13; 375/52
[58] Field of Search ................. 375/13, 118, 107, 106, 375/83, 99, 52, 101, 103; 455/50; 333/18, 28 R; 364/724.19, 724.20; 370/95.3

[56] References Cited

U.S. PATENT DOCUMENTS

| | | | |
|---|---|---|---|
| 4,674,103 | 6/1987 | Chevillat et al. | 375/13 |
| 4,789,952 | 12/1988 | Lo et al. | 375/13 X |
| 4,849,991 | 7/1989 | Arnold et al. | 375/84 |
| 4,937,841 | 6/1990 | Chuang et al. | 375/94 |
| 4,941,155 | 7/1990 | Chuang et al. | 375/84 |
| 5,127,051 | 6/1992 | Chan et al. | 375/13 X |

OTHER PUBLICATIONS

"Portable Digital Radio Communications–An Approach to Tetherless Access", D. C. Cox, *IEEE Communications Magazine*, Jul. 1989, vol. 27, No. 7, pp. 30–40.

"Universal Digital Portable Radio Communications", D. C. Cox, *Proceedings of the IEEE*, vol. 75, No. 4, Apr. 1987, pp. 436–477 pp. 436–477.

"Adaptive Equalization", S. U. H. Qureshi, *Proceedings of the IEEE*, vol. 73, No. 9, Sep. 1985, pp. 1349–1387.

*Primary Examiner*—Curtis Kuntz
*Assistant Examiner*—Tesfaldet Bocure
*Attorney, Agent, or Firm*—Leonard Charles Suchyta; Stephen M. Gurey

[57] ABSTRACT

A receiver for use in the port or portable units in a TDM/TDMA digital radio communications system is disclosed which incorporates an equalizer (107) to compensate for channel distortion due to multipath delay spread. Each received burst of information is oversampled at a multiple of the symbol rate and stored in a buffer memory (105). A joint estimator (106) processes the stored burst by operating on a known training sequence of bits within the burst to determine burst timing (where the burst actually begins) and the symbol timing (the optimum sample sample per oversampled symbol to be used for detection purposes). The estimator also determines whether the stored burst should be processed in a time-forward or time-reversed order. The joint estimator includes plural training equalizers (201), each of which is associated with an assumed burst location and each of which attempts to converge on the known training sequence as the stored sequence is circulated plural times through the equalizers in both the time-forward and time-reversed order. Burst and symbol timing and the optimum processing order are determined from the location of the training equalizer which converges with the minimum mean-square error. The determined burst and symbol timing, and the selected processing order, are passed to the buffer storage for read-out, in that selected order, of the stored burst information in that order to the input of the main receiver equalizer (107). That main equalizer is initially set with the equalizer parameters determined by the training equalizer yielding the minimum mean-square error. The equalizers can either be conventional fractionally-spaced decision feedback equalizers or can be phase equalizers, which operate on the received phase angle.

8 Claims, 8 Drawing Sheets

PHASE EQUALIZER FOR TDMA PORTABLE RADIO SYSTEMS

CROSS REFERENCE TO RELATED APPLICATION

This application describes and claims subject matter that is also described in our co-pending United States patent application also assigned to the present assignee hereof and filed simultaneously herewith: "TIME DISPERSION EQUALIZER RECEIVER WITH A TIME-REVERSAL STRUCTURE FOR TDMA PORTABLE RADIO SYSTEMS", Ser. No. 07/695,460 issued November 1992, now U.S. Pat. No. 5,155,742.

BACKGROUND OF THE INVENTION

This invention relates to a receiver design in a time division multiplexed/time division multiple access (TDM/TDMA) system used for low power portable digital telephony, and more specifically to a receiver design incorporating equalization techniques to cancel intersymbol interference due to multipath delay spread.

People by their very nature are highly mobile; no where is this more true than in modern day society with its myriad forms of travel. At the same time, many people increasingly have a need to be able to telephonically communicate with others particularly while they are on "the go", i.e. while they are moving.

However, this need for mobile communications, which existed for quite some time, has remained basically unsatisfied. Since telephones traditionally have cords, any movement of the telephone was traditionally limited by the length of its cord. For many years, only a veritable handful of telephones actually traveled with their users. These mobile telephones included aeronautical, marine and other forms of early radio telephones. Inasmuch as these mobile telephones were priced well beyond the affordability of the average telephone subscriber, none of these radio telephones ever encountered widespread use. Accordingly, for the vast majority of subscribers, a telephone set was installed at each subscriber location and there it remained unless it was reinstalled elsewhere. Thus, these subscribers either remained close to their telephone and thus restricted their mobility particularly in the anticipation of receiving a telephone call, or intentionally sought out a public or private telephone located along their route of travel whenever the need arose to place a telephone call.

Now with increasing sophistication of miniaturized electronic technology and decreasing attendant cost thereof, various vendors provide a number of devices (and/or services) that offer tetherless telephony. These devices, explained in more detail below, attempt to free a subscriber from being bound by the ambulatory constraints imposed by existing wireline telephone sets. In effect, each of these devices now permits subscribers effectively, at least to a certain extent, to take their telephone with them, obtain exchange access, and remain in communication wherever they go. These devices include cordless telephones, cellular mobile radio transceivers, public packet radio data network transceivers and radio pagers. As a growing number of consumers perceived the freedom of movement offered by these devices, a large demand was created for these devices. Moreover and not unexpectedly, as the prices of these devices continue to fall due to manufacturing economies and technical developments, the demand for these devices correspondingly continues to substantially increase. Specifically, approximately 25 million cordless telephone sets are in use today throughout the United States with demand for these sets continuing to rise as the price of cordless telephones with increasing sophisticated has remained within a $100.00 to $200.00 range. In addition, approximately three million cellular telephone sets are currently in use throughout the United States. As the price of various cellular sets falls from more than a $1000.00 which occurred merely a year ago to only a few hundred dollars today, the demand for these sets has increased precipitiously. As a result, the number of installed sets has climbed at such an astonishing rate that in certain urban areas, such as New York, the number of sets in use at peak times is beginning to strain the capacity of the existing cellular network to handle the concomitant call traffic.

While, each of the present tetherless telephonic technologies possesses certain advantages, each technology also unfortunately has certain drawbacks that significantly restrict its use. In this regard, see, e.g., Cox, "Portable Digital Radio Communications—An Approach to Tetherless Access", IEEE Communications Magazine, Vol. 27. No. 7, July 1989 pages 30–40; and Cox, "Universal Digital Portable Radio Communications", Proceedings of the IEEE, Vol. 75, No. 4, April 1987, pages 436–476.

Specifically, as to cordless telephones, such a telephone consists of two transceivers: a base unit and a handset, that collectively form a low power duplex analog radio link. The base unit is connected, typically by a subscriber to a wireline access point in a conventional telephone network in lieu of or as a replacement for a wireline telephone, in order to implement a tetherless substitute for a telephone cord. Once connected, the base unit appears to the telephone network as a conventional telephone. The base unit contains a transmitter and a receiver, and simple control and interface apparatus for dialing, accepting ringing, terminating calls and coupling voice from the telephone line to the transmitter and from the receiver within the base unit to the telephone line. The handset, which is truly portable, contains simple control logic for initiating, receiving and terminating calls with the base unit and for turning its own transmitter on and off. To provide true duplex operation, separate carrier frequencies are used by the transmitters in the base unit and handset. Since cordless telephones operate with very low input power to their transmitter, usually on the order of only several milliwatts, the handset generally utilizes several small rechargeable batteries as its power source. This enables the handset to be made relatively small, lightweight and to be continuously used for a relatively long period, typically several hours, before its batteries require recharging. Furthermore, the very low level of power radiated from the handset poses essentially no biological radiation hazard to its user.

Unfortunately, the primary disadvantage of cordless telephones is their highly limited service area. Because cordless telephones use relatively low transmitter power, these telephones have a maximum range that varies from typically a few hundred to a thousand feet, which in turn results in a very small service area. A secondary disadvantage associated with cordless telephones stems from the limited number of available frequencies. At present, only a few separate frequencies, typically up to 10 duplex channels, have been allocated by the Federal Communications Commission (FCC) for use by cordless telephones. Moreover, early cordless telephones by their very design have been very susceptible to co-channel interference. This interference arises by the simultaneous operation of two or more cordless telephones situated in close proximity to each other, such as in an immediate neighborhood of a residential area. In a very small geographic area with a very low density of users, a reasonable probability exists that within this area one or more duplex pairs will not be in use at any one time, and, as such, this interference will not occur therein. Nevertheless, in an effort to avoid this interference, relatively sophisticated cordless telephones are now capable of operating on any one of a number of preprogrammed duplex pairs with either the user or the telephone itself selecting, manually in the case of the user and automatically by the telephone, the specific pair that is to be used at any one time. Unfortunately, if a sufficient number of cordless telephones are in use in a very densely populated area, such as an apartment building, pair selection may not be sufficient to eliminate the expected incidences of co-channel interference that results from undisciplined and uncoordinated duplex pair assignment and the resulting chaos experienced by users situated therein. In addition, since cordless telephones rely on analog modulation of a duplex pair, conversations occurring over a cordless telephone are highly vulnerable to eavesdropping. Furthermore, a cordless telephone only provides limited protection against unauthorized long distance or message units calls being made therethrough. While preprogrammed digital or tone access codes are being used between individual handset-base unit pairs and provide sufficient protection against casual attempts at unauthorized access, these codes are not sufficiently sophisticated to successfully deter a determined orderly assault on a cordless telephone by an unauthorized user. Furthermore, while cordless telephones provide limited portable radio access to a wireline access point, from a network standpoint cordless telephones do not eliminate the need for telephone lines, i.e. a customer drop, to be run to each subscriber.

Nonetheless, in spite of these severe service restrictions, cordless telephones are immensely popular for the freedom, though very limited, that they furnish to their users.

In contrast to the very limited range provided by cordless telephones, cellular mobile radio systems accommodate wide ranging vehicular subscribers that move at relatively high speeds. These systems utilize a relatively high power 850 MHz transmitter, typically operating at an input of approximately 0.5 watt to several tens of watts, in a mobile unit with a relatively high efficiency antenna to access a wireline telephone network through a fixed cell-site (base station). The base station also uses a high power transmitter in conjunction with a tall antenna, typically erected on a tower or tall building, to provide a relatively large coverage area. Due to the expense, typically ranging to $300,000 exclusive of land and building costs, and the antenna size associated with each base station, the least number of base stations are often used to cover a given area. Nonetheless, this arrangement generally provides a circular service area centered on a base station with a radius of approximately 5-10 miles therefrom. In use, a cellular radio system that covers a large region often encompassing a city, its suburbs and major access highways typically includes a number of geographically dispersed base stations. The base stations, containing radio receivers and transmitters and interface and control electronics, are connected by trunks to and coordinated and controlled by one or more Mobile Telephone Switching Offices (MTSOs) that, in turn, also provide access to the conventional wireline telephone network. All of the duplex radio channels available to the entire system are sub-divided into sets of channels. The radio equipment in each base station has the capability of using channels from one of the channel sets. These sets are allocated to the base station in a pattern that maximizes the distance between base stations that use the same sets so as to minimize average co-channel interference occurring throughout a service region. One or more channels are designated for initial coordination with the mobile sets during call setup.

Each mobile (or hand-held) cellular transceiver used in the system contains a receiver and a transmitter capable of operating on any duplex radio channel available to the cellular system. Calls can be made to or from any mobile set anywhere within the large region covered by a group of base stations. The control electronics in the mobile transceiver coordinates with a base station on a special call setup channel, identifies itself, and thereafter tunes to a channel designated by the base station for use during a particular call. Each duplex channel uses one frequency for transmission from base-to-mobile and a different frequency for transmission from mobile-to-base. The signal strength of calls in progress is monitored by the base stations that can serve those calls. Specifically, when the signal strength for a given call drops below a predetermined threshold, typically due to movement of the cellular subscriber from one cell to another, the MTSO connected to that base station coordinates additional signal strength measurements from other base stations which surround the station that is currently handling the call. The MTSO then attempts to switch ("handoff") the call to another duplex channel if one of the other base stations is receiving a stronger signal than that being received at the base station that is currently handling the call. This handoff of calls, totally transparent to the cellular subscriber, preserves the quality of the radio circuit as the subscriber moves throughout the service region. Moreover, calls are handed off from one MTSO to another, as the subscriber transits from one service area into another. Inasmuch as frequency usage is coordinated, relatively efficient use is made of the available frequency spectrum while minimizing the likelihood co-channel interference. In each different geographic service area within the United States, there are two competing cellular systems using different frequencies.

Though cellular mobile radio systems provide wide range, these systems suffer various drawbacks. First, cellular systems were originally designed for use in motor vehicles whose electrical systems could readily provide sufficient power. While portable hand-held cellular transceivers do exist, they must operate with sufficient transmitter input power, typically at least 0.5 watt, to reliably reach a base station. This, in turn, requires that a relatively large battery must be used within the portable cellular transceiver. However, due to the limits of present rechargeable battery technology, the amount of time that the portable transceiver can be used before it requires recharging is often quite limited. Furthermore, the cost of these rechargeable batteries and hence of the portable transceiver is rather high. Moreover, high radiated power levels, such as that which emanate from a mobile or portable cellular transceiver, may be sufficient to pose a potential biological radiation hazard to its user. Furthermore, since cellular systems were not designed to compensate for radio attenuation occurring within buildings, these systems are only able to provide little, if any, service within a building. Low power portable cellular transceivers are not operationally compatible with large cell sizes, designed to match the needs of fast moving vehicular users, and thus often provide poor communication in many areas within these cells. In addition, since cellular systems rely on merely frequency modulating a carrier with voice or data, these systems are also susceptible to eavesdropping. Lastly, from a network perspective, cellular systems are quite inefficient. Due to the inclusion of MTSOs with trunks connected to individual base stations, backhaul of cellular traffic over wired trunks often occurs over several miles prior to its entrance into the wireline network, thereby resulting in a wasteful overbuild of network transport facilities.

Public packet radio data networks presently exist to handle infrequent bursts of digital data between a fixed base station and a number of portable data transceivers. The fixed site has a transmitter that uses several tens of watts; while each portable data transceiver uses a transmitter that operates at a level of several watts. As such, reliable coverage is provided over a service area that may extend several miles in radius from a base station. Individual base stations are connected by a fixed distribution facility to a controller that can, in turn, be connected to either a local exchange network, to handle voice-band data, or a packet-data network which itself interconnects various computers. Multiple users contend for transmission time on typically a single radio channel. Data transmissions on the channel are set up in either direction through bursts of coordinating data, handshaking, that occur between a base station and a portable data transceiver. Appropriate controller and radio link protocols are used to avoid packet collisions. Once a data transfer is complete between that base station and a data transceiver, the channel is immediately available for reuse by others. Although data bursts are transmitted at relatively high power, each burst is transmitted for only a short duration. As such, the average power consumption for a portable data transceiver is far less than that associated with a portable cellular transceiver thereby allowing physically smaller internal batteries to be used with portable data transceivers than those used in portable cellular transceivers. Nevertheless, the high radiated power levels associated with a portable data transceiver again pose a potential biological radiation hazard to its user. In addition, these networks disadvantageously suffer from limited digital transmission capacity which restricts these networks to carrying short data bursts and not voice, and, like cellular systems, experience coverage restraints when used within buildings.

In contrast to the tetherless systems discussed above, radio paging systems provide simple unidirectional transmission from a fixed location to a specifically addressed portable pager, which when received provides an alerting tone and/or a simple text message. Paging systems provide optimized one-way communication over a large region through a high power transmitter, typically a few kilowatts, that uses high antennas at multiple sites to provide reliable coverage throughout the region. Satellite based paging systems are also in operation to provide extended service regions. Since a pager is merely a receiver with a small annunciator, its power requirement is very low. As such, a pager is quite small, light weight, reliable, relatively low cost, and can operate for long intervals before its batteries need to be recharged or replaced.

Due to the advantages in size, cost and operating duration offered by pocket pagers, attempts exist in the art, to impart limited two-way communication into paging systems which are themselves highly optimized for one-way traffic. One such attempt includes incorporation of an "answer back" message through "reverse" transmission links between the individual pagers and the fixed sites. While these attempts have met with great difficulty, these attempts nevertheless indicate that a substantial demand exists for an inexpensive two-way portable truly tetherless telephonic service that overcomes the range limitations associated with cordless telephones and the weight and cost limitations associated with portable cellular systems.

Furthermore, various intelligent network services are now being offered by the local telephone operating companies in an attempt to provide wireline subscribers with a certain degree of call mobility when they are away from their own wireline telephones. These services include call transfer and call forwarding. Both call transfer and call forwarding allow a subscriber to program a local switch, using any pushbutton telephone, to transfer all subsequently occurring incoming calls that would otherwise be routed to this subscriber's telephone to a telephone associated with a different wireline telephone number that the subscriber desires anywhere in the world either for a given period of time, as in call transfer, or until that subscriber appropriately reprograms the switch with a different forwarding number, as in call forwarding. In this manner, the subscriber can, to a certain extent, continually instruct the telephone network to follow his or her movements and thereby route his or her incoming calls to a different number in unison with that subscriber's actual route of travel. Unfortunately, with these services, the subscriber must manually interact with the network and continually enter a new forwarding telephone number(s) coincident with his or her continuing travel such that the network is always cognizant of the current telephone number to which his calls are to be forwarded.

Thus, a substantial overall need exists in the art for a truly portable personal communication technology that is designed for pedestrian use and which utilizes small, lightweight and relatively inexpensive portable transceivers while eliminating, or at least substantially reducing, the performance drawbacks associated with the use of currently existing tetherless telephonic technologies in portable communication applications.

In an attempt to provide this needed technology, the art has turned to low power portable digital telephony. In essence, this technology, similar to cellular radio, uses a fixed base unit (hereinafter referred to as a port) and a number of mobile transceivers (hereinafter referred to as portables) that can simultaneously access that port on a multiplexed basis. However, in contrast to cellular radio, portable digital telephony uses low power multiplexed radio links that operate on a time division multiplexed/time division multiple access (TDM/TDMA) basis to provide a number of separate fully duplex demand-assigned digital channels between a port and each of its associated portables. Specifically, each port would transmit time division multiplexed (TDM) bit streams on a predefined carrier frequency, with, in turn, each portable that accesses that port responding by transmitting a TDMA burst on a common though different predefined carrier frequency from that used by the port. Quadrature phase shift keying (QPSK), with an inter-carrier spacing of 150 to 300 KHz and within a given operating frequency band situated somewhere between approximately 0.5 to 5 GHz would be used by both the port and portables. The power used by the transmitter in the portable would range between 5-10 milliwatts or less on average and provide a range of several hundred to a thousand feet. As such, the resulting low radiated power would pose essentially no biological radiation hazard to any user. In addition, the port antenna would be relatively small and suitable for mounting on a utility or light pole. With this transmission range, a port could simultaneously serve typically 20-30 separate locally situated portables. The same TDM channels would be reused at ports that are spaced sufficiently far apart to reduce co-channel interference to an acceptably low level but yet conserve valuable spectrum. To provide access to the wireline telephone network, each port would be interfaced, typically through a conventional fixed distribution facility, over either a copper or fiber connection to a switching machine at a local central office. The switching machine would be suitably programmed, in a similar manner as is an MTSO, to controllably and automatically handoff calls from one port to another as subscribers move their portables from port to port.

Due to the very limited transmitter power, each portable is anticipated to be very light-weight, physically small and provide a relatively long operating life between battery recharging or replacement. The cost to a subscriber for a portable is expected, through very large scale integrated (VLSI) circuit implementations, to reside in the range of $100.00 to $350.00. In addition, each port would require a relatively small electronic package and carry an overall expected cost of less than $25,000.00—which is far less, by at least an order of magnitude, than that of a current cellular base station. Moreover, the digital data carried on each channel could be readily encrypted to provide a desired degree of security and privacy against eavesdropping. Furthermore, with this technology, a port antenna, due to its small size, could be readily moved within a building to cope with signal attenuation occurring therein. Port spacings would be properly established within the building and frequency reuse would be properly controlled between these ports to provide portable service having an acceptably low level of co-channel interference to a high density of users situated therein.

From a network perspective, low power portable digital telephony is extremely attractive. At present, approximately $50-100 billion is invested by local operating telephone companies in costs associated with copper subscriber loops that run from distribution points to local telephone company demarcation points on individual customer drops. For a local telephone company, the per-subscriber cost of installing and maintaining a subscriber loop is generally greater at the loop end closest to a subscriber than at the far end thereof since the loop end is more dedicated to that subscriber than the far end is. Given the range provided by portable low power telephony, ports can be appropriately positioned throughout an area to provide radio link based exchange access and thereby substitute inexpensive mass produced VLSI circuitry for costly dedicated copper loops that would otherwise emanate from a distribution facility to an individual subscriber. Hence, by installing various ports throughout for example a building, significant labor intensive installation and maintenance tasks associated with rewiring of telephone drops and relocation of telephone equipment would be eliminated with substantial savings being advantageously realized in attendant subscriber costs as people are moved from office to office therein.

Now, with the attractiveness of low power portable digital telephony being readily apparent, its success, in great measure, hinges on achieving satisfactory performance through the use of TDMA. Various aspects of TDMA have been treated in prior art patents such as U.S. Pat. No. 4,849,991, entitled "Method and Circuitry for Determining Symbol Timing for Time Division Multiple Access Radio Systems," issued Jul. 18, 1989 to H. W. Arnold and N. R. Sollenberger, the former a co-inventor herein; U.S. Pat. No. 4,937,841, entitled "Method and Circuitry for Carrier Recovery for Time Division Multiple Access Radio Systems," issued Jun. 16, 1990 to J. C. Chuang and N. R. Sollenberger; and U.S. Pat. No. 4,941,155, entitled "Method and Circuitry for Symbol Timing and Frequency Offset Estimation in Time Division Multiple Access Radio Systems," issued Jul. 10, 1990 also to J. C. Chuang and N. R. Sollenberger. A technique for jointly performing burst synchronization and error detection in a TDM/TDMA system is described in co-pending patent application Ser. No. 404,946 filed Sep. 9, 1989. Also, a technique for assigning up-link frequencies to the portables in a TDM/TDMA system is described in co-pending patent application Ser. No. 619,059 filed Nov. 28, 1990.

In the receivers considered in the prior art references hereinabove, intersymbol interference due to multipath delay spread has not been considered a problem at the data rates at which the system has been assumed to operate and over the assumed coverage areas. Multipath delay spread will, however, significantly affect the error rate of a system operating at higher bit rates for purposes such as for nonvoice communications over an indoor wireless local area network, or at lower bit rates for voice-communications over a wide coverage area.

Traditionally, the deleterious effects of intersymbol interference (ISI) are cancelled using well known adaptive equalization techniques. Such traditional techniques can offer significant improvement at the expense of increased receiver complexity. In a low-power wireless portable digital radio communications system, however, the portable units must be small in size and consume minimal power, because of the use of small and light-weight power sources. In view of these constraints, simplicity and robustness of implementation must often take precedence over all other design aspects. The required complexity for equalizer implementation is influenced by the particular equalizer structure, the control structure, and the computation requirements of the adaptation algorithm. The robustness of an implementation refers to its sensitivity to to imperfections such as nonlinearities appearing in a practical receiver and its numerical stability when using a complex adaptation algorithm.

Conventional decision-feedback equalization (DFE) techniques also present an additional problem in radio communications. Specifically, in cancelling the interference due to multipath time delay spread, conventional DFE techniques require lower complexity when the earlier arriving signal has a stronger signal power than the signals arriving over the longer delay path. In the radio environment, however, the later arriving echo signals can often be stronger than the earlier arriving signal. Equalizing the interference from such signals would therefore require significantly more complex DFE equalizer structures. Specifically, equalizers with many taps are necessary, thereby requiring significantly more computations and structural complexity.

An object of the present invention is to equalize a signal in the presence of multipath time delay spread in a TDM/TDMA portable digital radio communications system.

An additional object of the present invention is to minimize the complexity of the equalizer structure for use in such a system.

SUMMARY OF THE INVENTION

The receiver of the present invention, for use in TDM/TDMA portable digital radio communications systems incorporates a time-reversal equalizer structure for recovering the transmitted signal. Specifically, the receiver includes a joint estimator which incorporates plural training equalizers for determining, for each received burst of information, both optimum symbol and burst timing, and for determining whether the burst should be equalized in a time-forward or a time-reversed manner. More specifically, equalizer training is performed during a predetermined training sequence of known bits which are embedded at a known location within each burst of information and which allow the equalizer to converge rapidly. Once the optimum symbol timing determination is made and the forward/reversed processing decision is made by the joint estimator, equalizer parameters are passed from the joint estimator to a main receiver equalizer which thereupon detects the transmitted data within the burst in the selected forward or reversed order of reception at the determined optimum symbol timing. The training equalizers incorporated within the joint estimator and the main equalizer can be either conventional fractionally-spaced decision feedback equalizer (FS-DFE) structures or can be lower-complexity phase-only equalizer structures. For quaternary phase shift keying (QPSK) signaling, the phase-only equalizer of the present invention estimates, during training, the phase-shift error on each possible present symbol due to intersymbol interference from previously transmitted QPSK symbol or symbols. Each received symbol is then detected, in the determined forward or reversed processing time order, by choosing as a transmitted symbol or symbol sequence the symbol or sequence having a minimum predetermined function of phase error. In the specific embodiment described, each symbol is detected by choosing as the transmitted symbol, the symbol that gives the minimum absolute phase error based on the knowledge of the previously detected symbol and the estimated phase shift due to intersymbol interference.

DETAILED DESCRIPTION

Figure 1:
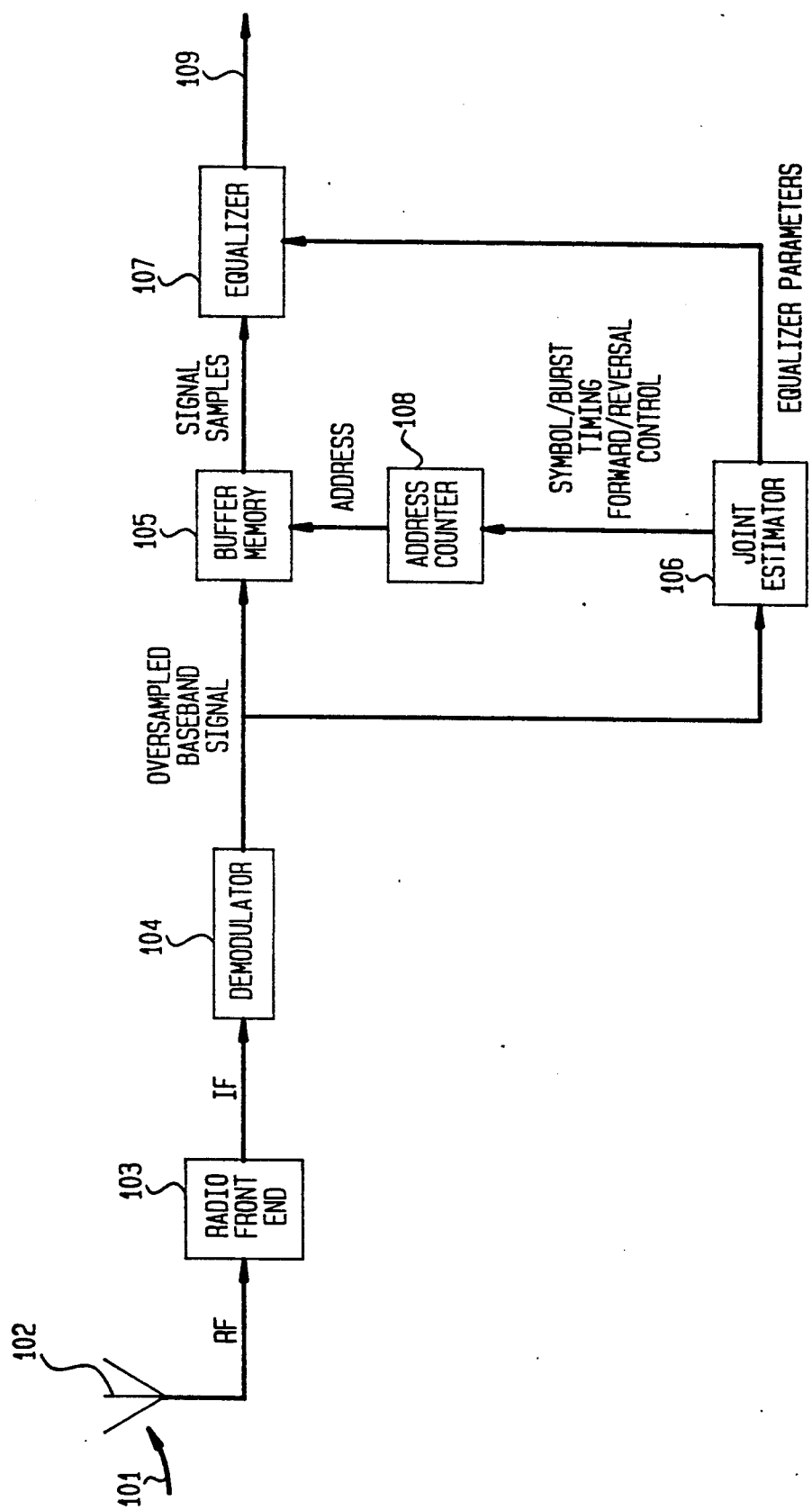
FIG. 1 is a block diagram of a receiver structure in a TDM/TDMA digital portable radio communications system that incorporates the present invention.

With reference to FIG. 1, a block diagram of a receiver structure incorporating the present invention is shown. This receiver, for use in either a portable unit or in the port of a TDM/TDMA portable digital radio communications system, adapts to the individually received bursts of data that are transmitted sequentially in time over fading radio channels. It is assumed that for portable radio applications, the fading rate is usually so slow that a quasistationary assumption applies over the duration of a TDMA data burst. Thus the equalizer within the receiver need adapt only once for each received burst, and once set, can be used to detect the transmitted data over the entire burst. Alternatively, once initially set, it can continue to adapt during burst symbol detection. As will be described, the present invention can use either a conventional decision feedback equalization (DFE) technique or a to-be-described phase equalization technique. For either embodiment, it is assumed that the signaling format is quaternary phase shift keying (QPSK). Furthermore, for purposes of adapting the receiver to each burst, each burst is assumed to have embedded at a fixed location within, a known training sequence of bits upon which the equalizer adapts itself. Due to the uncertainty of the exact timing of the beginning of a burst, however, the receiver to be described determines the optimum location of the training sequence and from that can locate the beginning of the burst.

The radio signal 101 is received by antenna 102 and fed to radio front end circuitry 103. The radio front end circuits 103 converts the received radio frequency (RF) signal to an intermediate frequency (IF) signal. These circuits can include an automatic gain control (AGC) amplifier or a pass-band hard-limiter, the latter structure requiring use of the to be described phase equalization technique. The IF output of radio front end circuits 103 is input to a demodulator 104. Demodulator 104 converts the IF signal to a sampled and digitized baseband signal. Specifically, demodulator 104 oversamples the IF signal at a multiple of the symbol rate since the optimum time for sampling the signal (symbol timing) is unknown. For equalization by a conventional DFE having half-symbol forward tap spacing, demodulator 104 produces sampled and digitized quadrature (in-phase I and quadrature phase Q) samples at twice the symbol rate. For phase equalization, greater oversampling is required to more precisely determine the optimum symbol timing. Accordingly, demodulator 104 oversamples the IF signal at eight times the symbol rate and produces at its output, signal phase values at that multiple of the symbol rate.

The oversampled baseband signal for the entire received burst, consisting of I and Q signal samples for conventional DFE or signal phase values for phase equalization, is stored in a buffer memory 105. Since the actual beginning and the end of the burst are only known approximately in time, a window of samples is stored that exceeds the width of the actual burst and thus captures the entire burst with a high degree of certainty. At the same time, a portion of the received burst is processed by a joint estimator 106. Joint estimator 106 will be described in detail hereinafter. Functionally, however, joint estimator 106 selects the optimum burst timing (i.e. determines the location of the training sequence within the window of stored bits and from that information determines the actual beginning of the burst within the window); selects the optimum symbol timing (i.e. determines which of the oversampled samples is closest to the actual symbol timing); selects a forward or reversed processing order mode; and trains the equalizer (i.e. provides a starting point for equalizer parameters). The starting point equalizer parameters generated by joint estimator 106 are then transferred to equalizer 107 for processing of the burst stored in buffer memory 105. At this same time, joint estimator 106 passes the burst/symbol timing information and forward/reverse processing information to an address counter 108. Address counter 108 thereupon initiates readout of the burst data stored in buffer memory 105. Specifically, the beginning and the end of the burst are fixed from the burst timing determined by joint estimator 106. Thus the location of the first and last symbol in the data stored in buffer memory are determined for readout. In addition, the particular sample per symbol for optimum symbol timing is determined from joint estimator 106, as is the optimum direction of processing, i.e. forward or reversed. Buffer memory 105 thereupon reads out the symbol by symbol stored data at the determined symbol timing in the determined forward or reversed processing direction. For conventional DFE equalization, the I and Q signal samples are output by buffer memory 105 to a DFE equalizer 107, and for phase equalization the phase signal samples are output to a phase equalizer 107. Equalizer 107, either a conventional DFE or a phase equalizer to be described hereinafter, equalizes the stored burst data and outputs the detected data onto output lead 109.

As aforenoted, joint estimator 106 performs timing recovery, equalizer training, and optimum forward/reversed processing order selection functions. As will be described, estimator 106 includes plural training equalizers of a similar type as equalizer 107 (i.e. either DFE or phase equalization), and performs these multifunctions by operating on a training sequence (TS) which is embedded within each received burst at a known location. This short training sequence of known information is chosen to allow rapid equalizer convergence. In order to minimize the transmission overhead required for joint estimation, the received signal sequence corresponding to the training sequence is repeatedly recirculated in the joint estimator until adequate equalizer convergence is reached. Various equalizer adaptation algorithms can be used such as a least means square (LMS) or a recursive least square (see, e.g., J. G. Proakis, *Digital Communications*, New York: McGraw-Hill, 1983; and S. U. H. Qureshi, "Adaptive Equalization," *Proc. IEEE*, vol. 73, No. 9, September 1985). For a low complexity implementation, a simple LMS algorithm is the most suitable.

As aforenoted, joint estimator 106 determines the burst timing of each burst, i.e. the location of the actual beginning and end of each burst, and the symbol timing, i.e. the optimum sampling time for each symbol. In a TDMA/TDM portable digital radio communications system, the approximate arrival time of each data burst is known within a window of several symbol periods. The exact timing of the burst, however, will vary from burst to burst due to different overall radio propagation delays and time dispersion, and due to differences in the amount of drift in the transmitter and receiver clocks. In view of this uncertainty of the actual burst location, as noted above, the window of samples stored by buffer memory 105 exceed the actual burst length. Therefore, the joint estimator must operate on a portion of the burst that is larger than the training sequence to search for the training sequence since its location is uncertain. In particular, this joint estimation window needs to be larger than the width of the training sequence by the number of symbols of uncertainty in the burst location. As aforenoted, the received signal is oversampled by a multiple of the symbol rate. In the described embodiments, and as noted hereinabove, for purposes of DFE, oversampling is performed at twice the symbol rate, and for purposes of phase equalization, oversampling is performed at eight times the symbol rate. Thus, in addition to the burst timing uncertainty, there is uncertainty as to which one-of-two or one-of-eight samples per symbol is closest to the actual symbol timing. As will be described hereinafter, joint estimator 106 includes plural training equalizers each of which operates on the signal within the burst window for different possible burst timings spaced T/2 apart, where T is the length of a symbol. Signal samples which include the training sequence plus the extra samples associated with the burst location uncertainty are repeatedly recirculated through the training equalizers until the equalizers converge, the number of recirculations required for convergence being a function of the number of equalizer taps. A quality measure is then assigned to each of the TEs, this measure being the mean-square error (MSE) of each equalizer. The training equalizer that is connected to receive the properly aligned training sequence will converge most rapidly and with the lowest MSE. The training equalizer producing the lowest MSE in a forward processing order is first determined. The training equalizers are then reset to their starting state and the signal samples are recirculated through them in the reversed signal processing order, last symbol in the burst, first into the equalizer. The TE with the lowest MSE is determined and this minimum MSE is compared with the lowest MSE obtained in the forward processing direction. The lower of these two minimum MSEs, and the associated location of the associated TE determine both the direction that equalizer 107 is to process the stored signal samples and the burst timing, i.e. the proper time alignment of the burst. If conventional DFE equalization is employed, this aforedescribed processing also determines the proper symbol timing since the training equalizers are spaced in half-symbol time increments. If, however, phase equalization is employed, then once the optimum processing direction and half-symbol time increment are determined, further training is performed at each of the four sample times surrounding as symmetrically as possible, and including, the selected half-symbol-spaced sample time. The particular sampling time amongst these eight sampling times that yields the minimum MSE is determinative of the optimum symbol timing. For either conventional or phase equalization, once the optimum symbol timing is determined, the equalizer parameters (the tap-weight coefficients) of the training equalizer associated with that optimum timing are passed by joint estimator 106 to equalizer 107 for processing by equalizer 107 of those signal samples (I and Q or phase values) stored in buffer memory 105 at the selected symbol timing, in the optimum forward or reversed processing order, commencing with the first or last symbol in the burst as determined from the burst timing.

Figure 2:
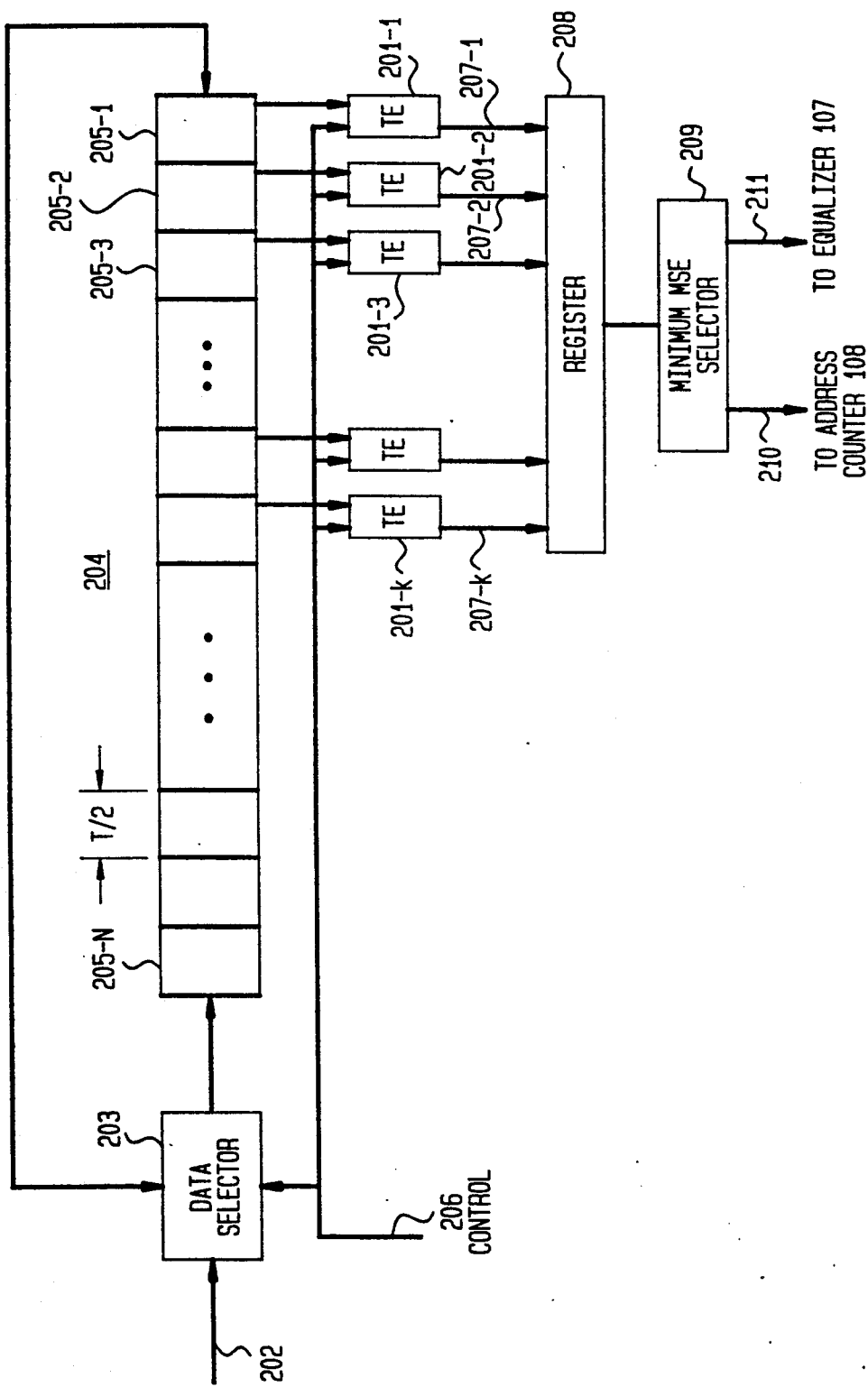
FIG. 2 is a block diagram of the joint estimator used in the receiver of FIG. 1 for determining the optimum processing direction, the optimum burst/symbol timing, and the initial equalizer paramenters when a conventional equalization technique is employed in the receiver.

In describing the operation of joint estimator 106 in detail, it will first be assumed that a conventional DFE is employed for the training equalizers and as equalizer 107. The structure and operation of a conventional DFE will not be described in detail as it is well known to those skilled in the art, and can be found in many text books and papers such as the aforenoted paper by S. U. H. Qureshi. With reference to FIG. 2, a block diagram of joint estimator 106 is shown in which all the training equalizers (TEs) 201-1, ... ,201-i, 201-j, and 201-k are conventional decision feedback equalizers. The oversampled I and Q samples, oversampled at twice the sampling rate, are input over lead 202 through a data selector 203 to a recirculating shift register 204. Shift register 204 has storage locations 205-1, 205-2, ... ,205-N sufficient in number to store the samples associated with the length of the training sequence plus the uncertainty of the location of the training sequence due to the uncertainty of the arrival time of the burst. Since there are two samples per symbol, N is equal to twice the length of the training sequence plus twice the uncertainty.

Data selector 203, operated in response to a control signal on lead 206, functions to gate only the training sequence (plus the uncertainty) into shift register 204. Training equalizers 201-1-201-k are connected to the first k storage locations, 205-1-205-k, of shift register 204. The first storage location refers to the storage location storing the earliest arriving signal samples and thus is the storage location furthest to the right. Once the training sequence samples are gated into register 204, the control signal initializes the tap coefficients within training equalizers 201-1-201-k before the training process begins. The control signal then initiates data selector 203 to commence circulation of the stored training sequence samples through the plural storage locations of register 204 for multiple passes first in a time-forward direction and then for multiple passes in a time-reversed direction, the training equalizers being signaled by the control signal with the direction in which to expect reception, and being initialized between direction changes. During processing, each of the training equalizers 201-1-201-k assumes that the signal sample in the storage location 205 to which it is directly connected is the first sample in the training sequence and at the proper symbol timing. In the plural passes of the stored sequence, each training equalizer attempts to converge itself. Since the training sequence is a known sequence of data, the one training equalizer 201 associated with the actual timing of the training sequence and at the optimum symbol timing will converge "better", which can be determined from a measurable quantity, noted above and well known in the art, as the mean-square error (MSE). Accordingly, after attempting to converge on the sequence circulating in the time-forward direction through shift register 204, each training equalizer 201-1-201-k, produces on its outputs 207-1-207-k, respectively, this mean-square error measure of quality. Each of the training equalizers, 201-1-201-k, also produces the equalizer tap weights on its outputs 207-1-207-k, respectively (which are shown in FIG. 2 as being only one lead but are actually plural leads). Training equalizer 201-1-201-k outputs 207-1-207-k are connected to a register 208 which stores, for each training equalizer, the MSE and the associated equalizer tap weights. Minimum MSE selector 209 selects and stores the minimum MSE, the tap weights associated with the training equalizer having the minimum MSE, and the associated burst and symbol timing. Data selector 203 then reverses the direction of circulation within shift register 204 and the training equalizers 201-1-201-k are signaled to expect the training sequence in reversed order. Each of these training equalizers 201-1-201-k again attempt to converge on multiple passes of the reversed-order data. Register 208 stores the MSE and tap weights for each training equalizer in this processing order and selector 209 compares the minimum MSE obtained in the forward processing direction with that obtained in the reverse processing direction to determine the overall minimum MSE. Selector 209 outputs on lead 210 (actually plural leads), the selected forward or reverse order processing direction with the associated symbol and burst timing address counter 108 in FIG. 1. Similarly, selector 209 outputs on lead 211 (actually plural leads) the tap weights of the equalizer having the minimum MSE to equalizer 107 in FIG. 1. With reference to FIG. 1, and as discussed hereinabove, the equalizer parameters that are passed to equalizer 107 initialize the tap weights therein, and the symbol and burst timing and the forward/reversed control signals passed to address counter 108, determine which samples and in which order the signal samples in buffer memory 105 are passed to equalizer 107. Once the initial tap weights are passed to equalizer 107, equalizer 107 can either "freeze" its coefficient values or it can continue to adapt in a conventional manner as the actual data stored in buffer memory 105 is fed to it in either the selected time-forward or time-reversed processing direction.

The discussion hereinabove has assumed that equalizer 107 and the training equalizers 201-1-201-k within joint estimator 106 are all conventional distributed feedback equalizers. The concept of phase equalization will now be described. Phase equalization, advantageously, is simpler in its implementation than conventional DFE techniques and therefore is attractive for applications where circuit compactness and cost are significant factors. Although the performance (i.e. low block error rate) of a receiver in a TDM/TDMA portable digital radio communications system using a time reversal phase equalizer structure for very high bit rate data communications will not be as high as a receiver using a time reversal conventional DFE structure, its performance for expanding coverage areas at moderate bit rates expected in voice communications has been experimentally found to be acceptable and is simpler to implement than receivers using conventional equalization techniques without the time reversal structure.

Figure 3:
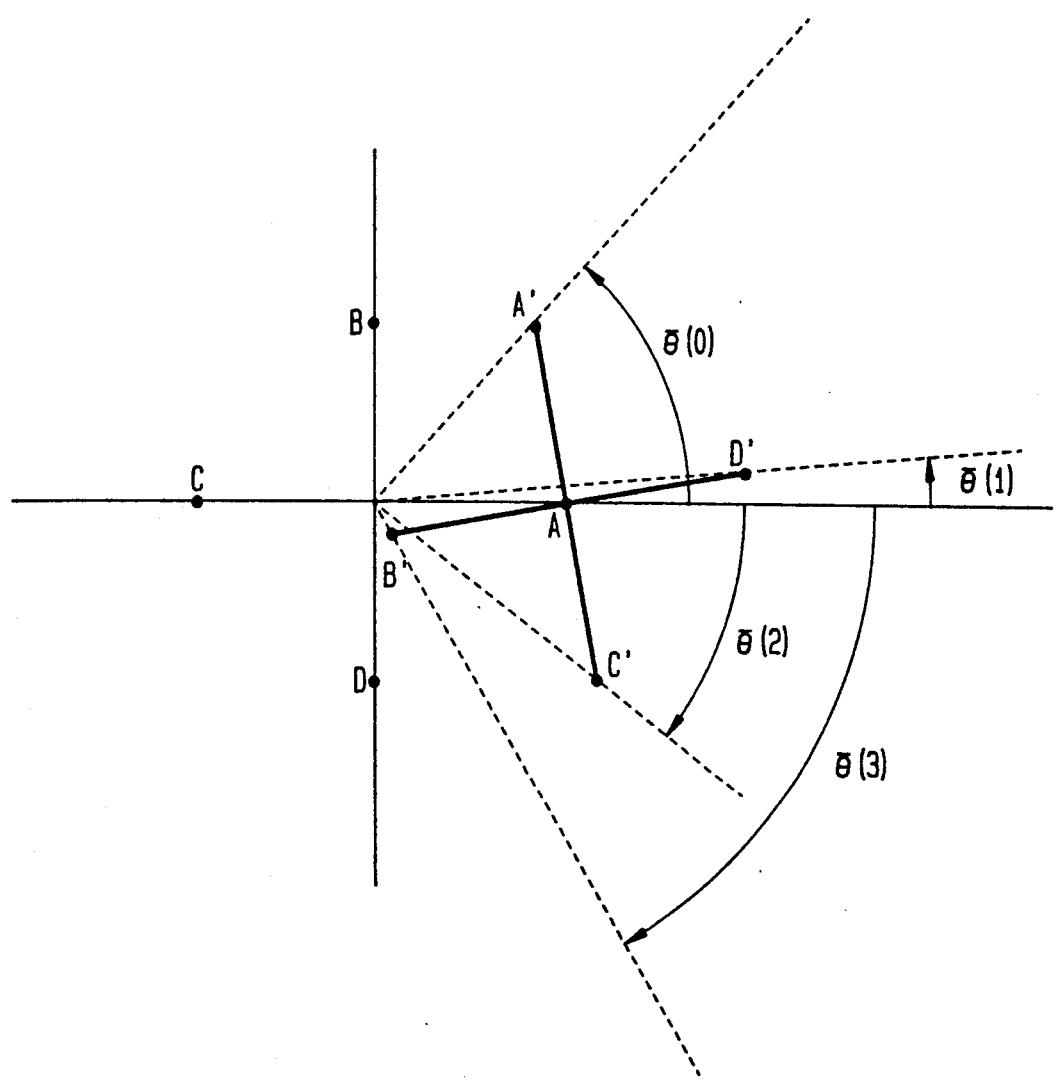
FIG. 3 shows, on the phase plane, the effect of intersymbol interference on the of expected received signal point of a QPSK modulated signal.

For phase equalization, the demodulator 104 in FIG. 1 outputs received phase angles to buffer memory 105 rather than the I and Q components of the samples. For QPSK transmission, the function of the equalizer 107 is to determine, based on the knowledge of the previously detected symbol or symbols, which of four symbols was actually transmitted by compensating for the effect of phase error on the received signal due to intersymbol interference (ISI) and carrier phase shift on the channel. Carrier phase shift causes the expected phases to uniformly change during the burst while the effect of ISI is to cause each received symbol to form a QPSK constellation around each of the four expected points. FIG. 3 shows how these phase shifts can be represented geometrically in the signal space. Assuming A is the transmitted signal point (phase angle of 0°), the four points A', B', C', and D' represent the effect of ISI on that transmitted signal point due to ISI from each of the four possible previously transmitted signal points. The phase shift on a transmitted signal at 0° of the previous signal was also at 0° is shown in the figure to be $\theta(0)$ (point A'). If the previous phase is 90° behind the current phase, then the phase shift due to ISI will cause the expected received phase angle to be $\theta(1)$. Similarly, if the previous phase is 180° or 270° behind the current phase, the phase shifts due to ISI will cause the expected received phase angles to be $\theta(2)$ and $\theta(3)$, respectively. Similar constellations surround (not shown) each of the other three expected symbol locations (B, C and D). Each of these constellations is identical to that shown surrounding point A, but are shifted by 90°, 180° and 270°, respectively. Furthermore, the amplitude of each of the four constellations is the same and is determined by the channel characteristics. The embodiment described herein assumes that ISI is due only to the previous symbol. If ISI is due from two previous symbols, separate constellations of different amplitudes surround each of the four points surrounding point A, A', B', C' and D', and in the constellations surrounding points B, C and D. If ISI is due to three previous symbols, then constellations surround these points, and so forth. In the embodiment described herein, however, it will be assumed that ISI is due only to the previous symbol. As noted above, in addition to the phase shift due to ISI, the entire plane of received angles is rotated by a constant phase shift to a carrier phase shift, which is symbol independent and constant for the duration of the burst.

Functionally, the phase equalizer determines which of four symbols is transmitted by compensating for the effect of phase shift due to ISI. During the training sequence, the carrier phase shift is determined for the entire burst and the four possible phase shifts due to ISI for each particular relationship between the current and previous symbol are estimated. During the symbol detection phase the main equalizer assumes the four symbol possibilities for each received current symbol. Based on the knowledge of the previously detected symbol (assumed to be correct), the expected phase angle is determined for each of the four possible current symbols as corrected by the previously estimated phase shift due to ISI and carrier shift. The one-out-of-four symbol that yields the smallest difference between the actually received phase angle and the expected phase angle as corrected by the estimated phase shift for that one-out-of-four symbol is assumed to be the transmitted phase angle.

Figure 4:
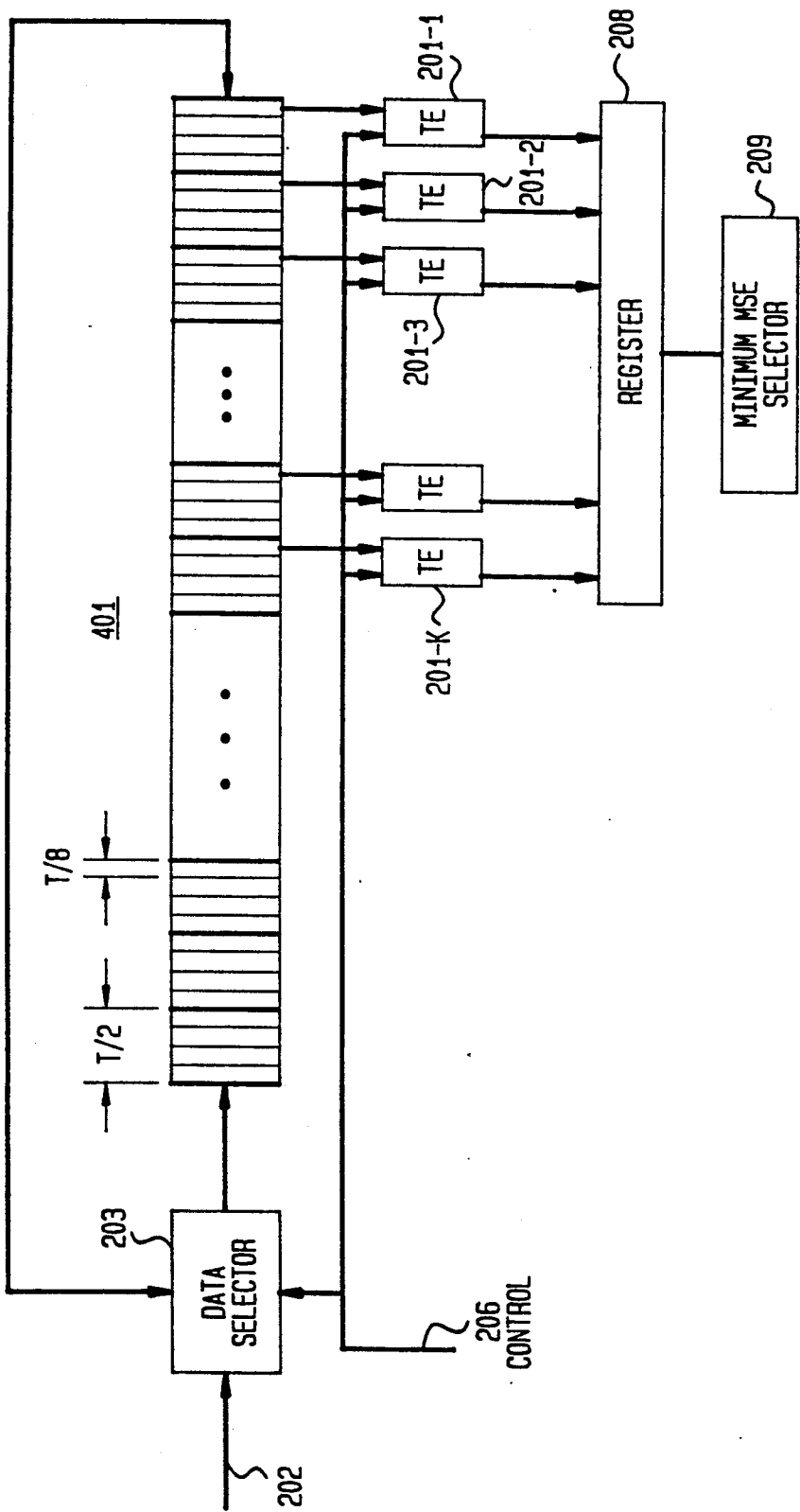
FIG. 4 is a block diagram of the joint estimator used in the receiver of FIG. 1 for determining the optimum processing direction, the optimum burst/symbol timing, and the initial equalizer parameters, when a phase equalization technique rather than a conventional equalization technique is used in the receiver.
Figure 5:
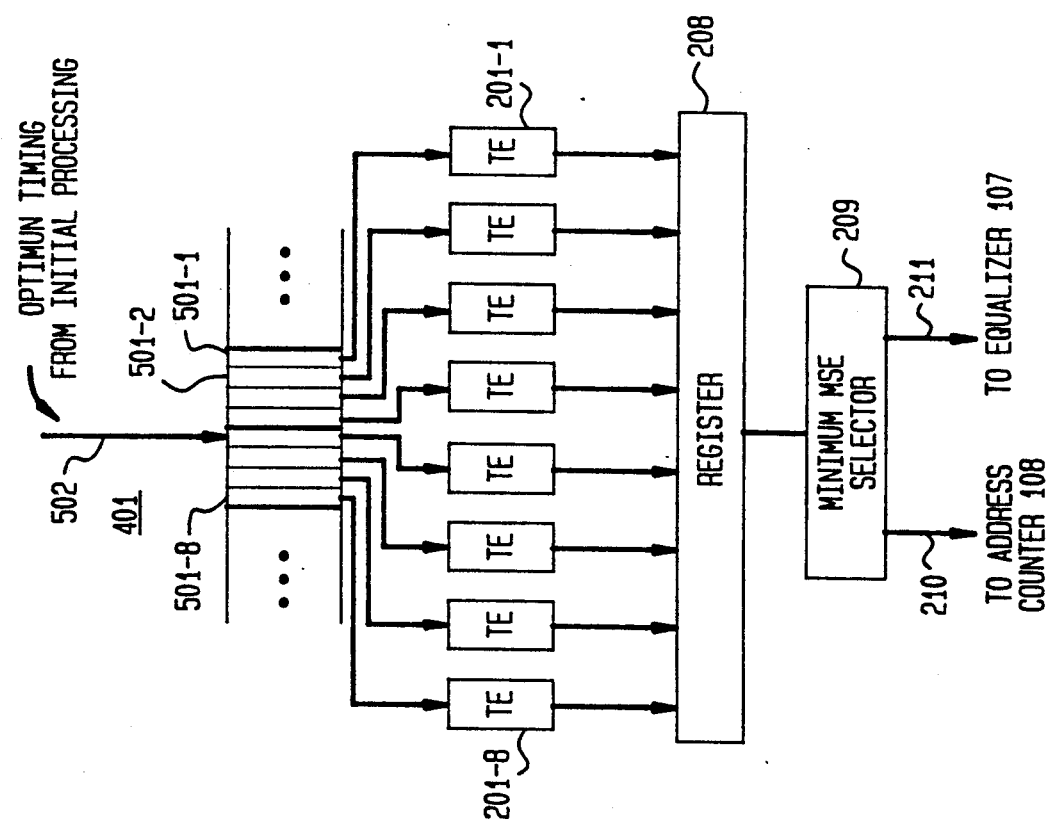
FIG. 5 shows a portion of the joint estimator in FIG. 4 as reconfigured during processing to precisely determine burst/symbol timing.

For phase equalization, maximum oversampling of the received signal is required to more precisely determine the symbol timing. In this embodiment, therefore, the demodulator 104 in FIG. 1 generates signal samples (representing phase angles) at eight times the symbol rate. Accordingly, buffer memory 105 is required to store a number of samples equal to eight times the received burst length. These oversampled phase angles are input to joint estimator 106, which is shown in FIG. 4 and which structurally and functionally is similar to the joint estimator shown in FIG. 2. In FIG. 4, similar numerical designations are given to those elements similar or identical to corresponding elements in FIG. 2. The significant difference in FIG. 4, however, is that shift register 401 requires has eight storage location per symbol period T rather than two as the shift register 204 in FIG. 2. Each of the training equalizers, 201-1–201-k, is connected to receive the first sample per half symbol period. The structure of the training equalizers, 201-1–201-k, will be described below. Functionally, and as previously described, each of the training equalizers, 201-1–201-k, attempts to converge on the known training sequence in both a forward and reversed processing order, and a quality measure, to be described, is used to determine both the optimum direction of processing and the optimum symbol and burst timing. Once this optimum timing amongst every half-symbol is determined, joint estimator 106 is reconfigured, as shown in FIG. 5, to directly connect eight training equalizers, 201-1–201-8, to the eight storage locations, 501-1–501-8, centered as symmetrically as possible around the selected optimum half-symbol-spaced sample time 502. The stored data is again recirculated plural cycles through these eight training equalizers in the processing direction selected at the previous configuration, and the training equalizer 201-1–201-8 yielding the best quality measure is used to determine the optimum symbol/burst timing. Selector 209 outputs the selected processing order and the burst/symbol time on lead 210 (actually plural leads). The phase shifts due to ISI for each of the four phase relationships between the current and previous symbol as determined by that optimum training equalizer are then passed by selector 209 over lead 211 (plural leads) to main equalizer 107 for processing the phase angles stored in buffer memory 105.

Figure 6:
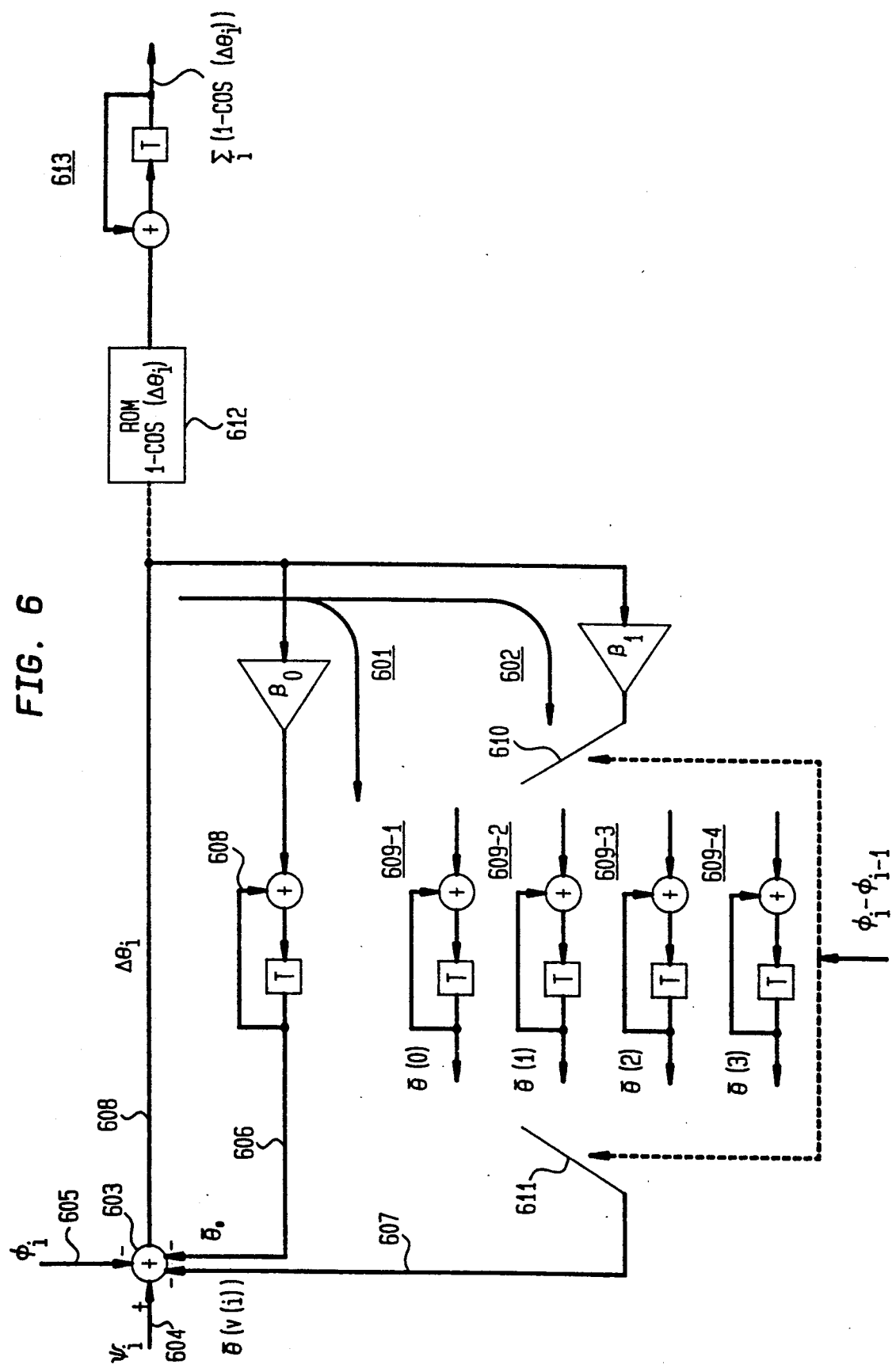
FIG. 6 shows a diagram of the training phase equalizer used in the joint estimators of FIGS. 4 and 5 for estimating, during a training period, the phase shifts due to intersymbol interference and carrier phase shift.

FIG. 6 shows the data-directed phase tracking circuitry used as each training equalizer for estimating the carrier phase shift $\theta_0$ and the four possible phase shifts, $\theta(0)$, $\theta(1)$, $\theta(h2)$, and $\theta(3)$, due to ISI. In the symbol $\theta(n)$, for n=0, 1, 2, and 3, n represents the factor ×90° between the current and previous phase angles. The circuit comprises two phase tracking loops 601 and 602 with different step sizes $\beta_0$ and $\beta_1$, respectively. Each loop performs data-directed first-order phase recovery. Loop 601 tracks the carrier phase shift, $\theta_0$, while loop 602 tracks the phase shift $\theta(v(i))$ due to ISI for all possible v(i), where v(i) represents the four possible phase relationships, noted above, between the current symbol and the previous symbol (0°, 90°, 180° and 270°), and i represents symbol time. At each symbol time i, a signal combiner 603 combines the received phase angle, $\Psi_i$, on lead 604, with the known symbol in the training sequence, $\phi_i$, on lead 605, the phase locked loop 601 derived carrier phase shift $\theta_0$ on lead 606, and the phase locked loop 602 derived phase shift, $\theta((v(i))$, due to ISI for that particular known symbol on lead 607. The output of signal combiner 603 on lead 608 is the residual phase error $\Delta\theta_i$.

As the stored received phase angles, $\Psi_i$, on lead 604 and the expected phase angles, $\phi_i$, from the training sequence on lead 605 are input to combiner 603, the first loop, which includes an accumulator and integrator 608, is driven to track the carrier phase shift, $\theta_0$, which is constant for the burst. As the training sequence is passed through the loop and sufficient convergence is realized, the output on accumulator 608 represents only the phase shift due to carrier shift and has no components dependent upon phase shift due to ISI. The second phase-locked loop 602 includes four separates signal paths, which include accumulator and integrators 609-1–609-4, for tracking the phase shift due to ISI for each of the four possible phase shifts, $\theta(0)$, $\theta(1)$, $\theta(2)$, and $\theta(3)$, respectively. Switches 610 and 611 are operated in tandem in response to the difference between the expected current symbol $\phi_i$ and the previous expected symbol, $\phi_{i-1}$, on input lead 605. As the received sequence and expected sequence are circulated and recirculated through the training equalizer, the appropriate phase shifts due to ISI are accumulated and integrated so as to track the phase shifts due to ISI for each of the four possible shifts.

After initial attempts at convergence (circulation of the training sequence at least twice), it can be shown that a measure of convergence can be derived from the residual error, $\Delta\theta_i$. In particular the sum of $(1-\cos(\Delta\theta_i))$ over the training sequence can be shown to be the MSE from the estimation. Thus, after initial convergence, lead 608 is connected (by dotted line) to a read only memory (ROM) 612 for a table look-up of $1-\cos(\Delta\theta_i)$ and accumulation and integration by accumulator and integrator 613. The output of accumulator and integrator 613 is equal to $$\sum_i (1 - \cos\Delta\theta_i).$$

which output is used as the quality measure of the training process. As described in connection with use of the conventional DFE, this quality measure is derived by each of the training equalizers and in both directions of processing to determine the training equalizer with the minimum MSE and thus the optimum symbol/burst timing and processing direction. As noted above in connection with phase equalization, once the optimum processing direction and optimum symbol timing are determined in half-symbol increments, a more precise timing is determined amongst the eight samples per symbol that surround the just determined half-symbol. The training equalizer producing the overall minimum MSE then determines the symbol/burst timing and the direction or processing to be performed on the stored burst data by the main equalizer. Furthermore, the carrier phase shift, $\theta_0$, and the four phase shifts due to ISI, $\theta(0)$, $\theta(1)$, $\theta(2)$, and $\theta(3)$, derived by the training equalizer producing the minimum MSE are passed to the main equalizer for subsequent processing of the burst.

Figure 7:
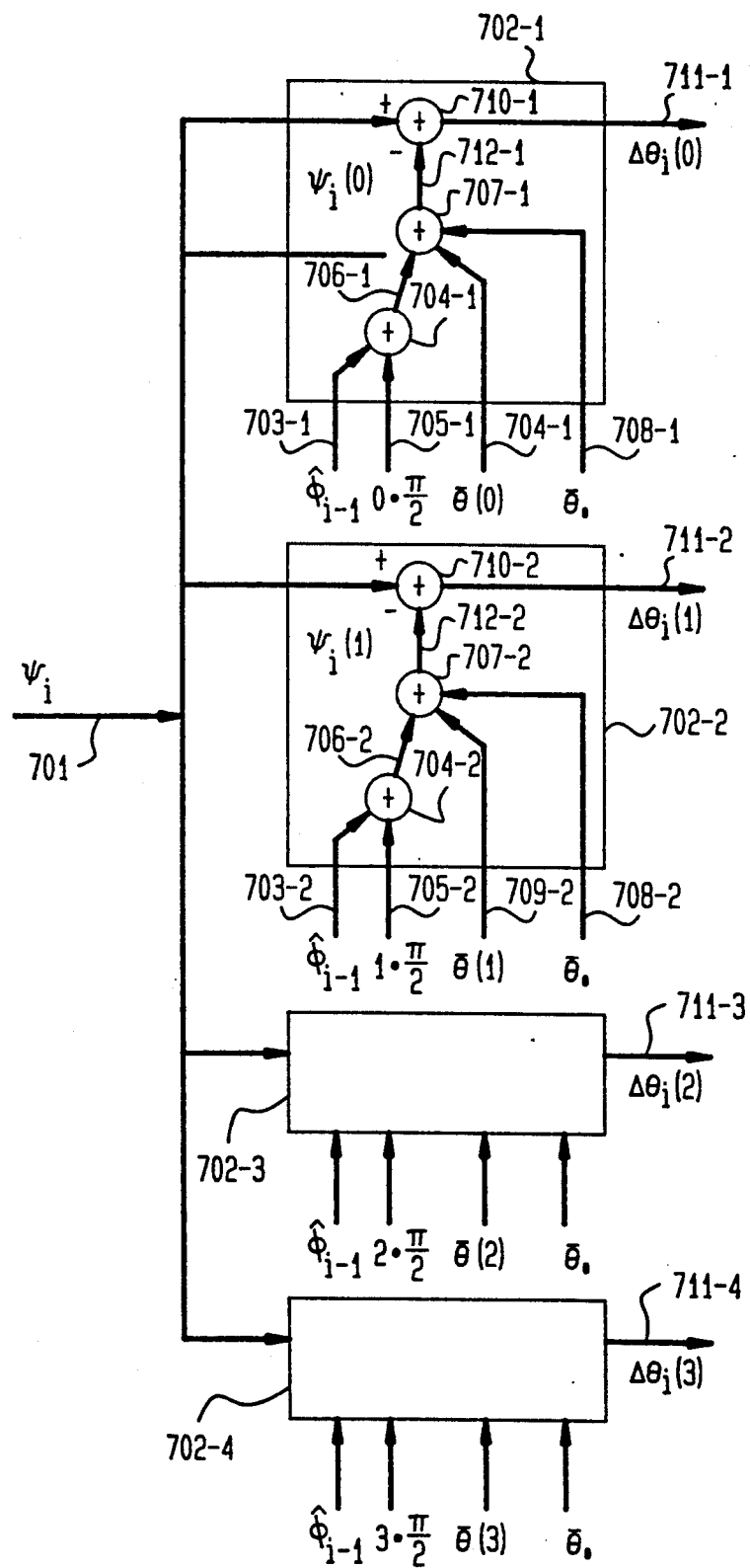
FIG. 7 shows a diagram of that portion of the main phase equalizer used to determine the four possible phase errors that correspond to each received phase angle.

FIG. 7 shows the circuitry in the main equalizer 107 (in FIG. 1) used for determining each received symbol phase angle, $\Psi_i$, passed from the buffer memory 105 (in FIG. 1) at the one-out-of-eight symbol timing, the four candidate phase errors, $\Delta\theta_i(0)$, $\Delta\theta_i(1)$, $\Delta\theta_i(2)$, and $\Delta\theta_i(3)$. These four candidate phase errors represent the differences between the actually received symbol phase angle, $\Psi_i$, and the four estimates of the possible received phase angles based on the knowledge of the previously detected phase angle, $\phi_{i-1}$, the correction necessary due to phase shift from ISI, $\theta(v(i))$, and the carrier phase shift, $\theta_0$, the latter being symbol independent. In FIG. 7 the received symbol phase angle, $\Psi_i$, on input lead 701 is input to four phase error circuits 702-1–702-4, which individually derive the four individual candidate phase errors, $\Delta\theta_i(0)$, $\Delta\theta_i(1)$, $\Delta\theta_i(2)$, and $\Delta\theta_i(3)$, by assuming that the difference between the present symbol phase angle and the previous symbol phase angle is 0°, 90°, 180° and 270°, respectively.

Within phase error circuit 702-1 the previous symbol phase angle, $\phi_{i-1}$, on lead 703-1 is summed by adder 704-1 with the assumed difference on lead 705-1 between the current phase angle and the previous phase angle, which for circuit 702-1 is $0 \times \pi/2$. The output on lead 706-1 is a candidate for the current symbol but requires correction by the phase shift from ISI and the carrier phase shift. Adder 707-1 therefore adds the candidates current symbol on lead 706-1 to the carrier phase shift, $\theta_0$, on lead 708-1, and the phase shift from ISI, $\theta(0)$, assuming as is done within circuit 702-1 that the phase difference between the current symbol and the previous symbol is 0°. The output of adder 707-1 on lead 712-1, $\Psi_i(0)$, thus represents an estimate of received phase based on the assumption that the difference between the previous symbol phase angle and the current symbol phase angle is 0° (i.e. the current symbol is the same as the previous symbol). Signal combiner 710-1 forms a difference between the received phase angle, $\Psi_i$, on input 701 and this estimated phase angle, $\Psi_i(0)$, to produce the candidate phase error $\Delta\theta_i(0)$ on lead 711-1.

Phase error circuits 702-2–702-4 similarly produce the candidate phase errors $\Delta\theta_i(1)$, $\Delta\theta_i(2)$, and $\Delta\theta_i(2)$ on leads 711-2, 711-3 and 711-4, respectively, by assuming differences between the current symbol and the previous symbol at 90°, 180°, and 270°, respectively. In each of the four phase error circuits 702-1–702-4, the four phase shifts from ISE, $\theta(0)$, $\theta(1)$, $\theta(2)$, and $\theta(3)$, and the carrier phase shift, $\theta_0$, are initially supplied from the training equalizer determined to produce the minimum MSE. As the burst is processed, however, the four phase shifts from ISI and the carrier phase shift can be continually updated based on the received data, as will be shown.

Figure 8:
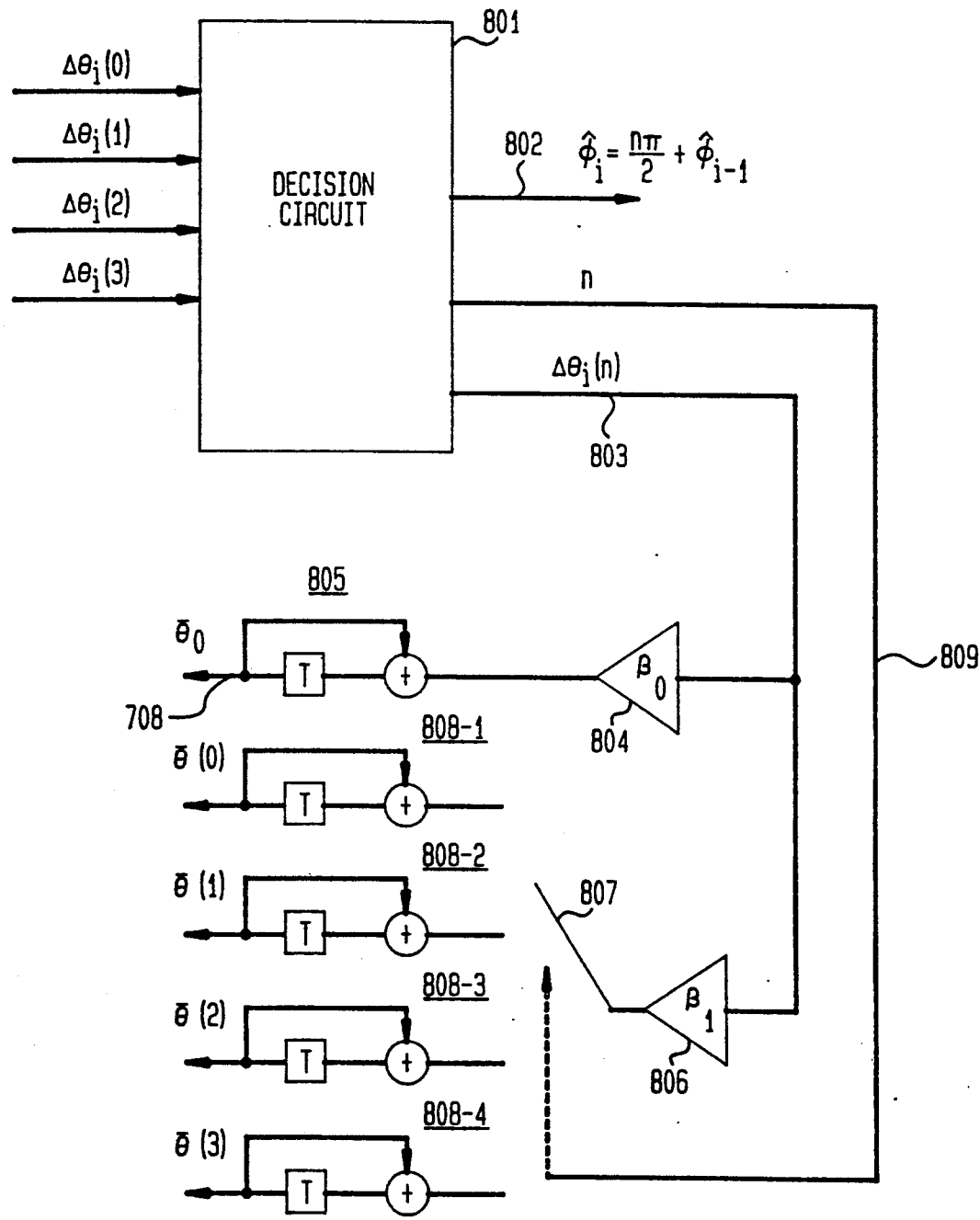
FIG. 8 shows a diagram of that portion of the main phase equalizer used to determine, for each transmitted symbol within the received burst, the transmitted phase angle, and for updating, during processing of the burst, the estimates of phase shift due to intersymbol interference and carrier shift.

FIG. 8 shows the circuitry within the phase equalizer for determining, symbol by symbol, what the transmitted symbol phase angle is. The four candidate phase errors $\Delta\theta_i(0)$, $\Delta\theta_i(1)$, $\Delta\theta_i(2)$, and $\Delta\theta_i(3)$ on leads 711-1–711-4, respectively, from the circuitry in FIG. 7, are input to a decision circuit 801. Decision circuit 801 selects the minimum absolute candidate phase error, $\Delta\theta_i(n)$, to determine the most likely phase difference between the current and the last symbol. The current symbol phase angle on lead 802, $\phi_i$ is thus determined by:

$$\phi_i = n\frac{\pi}{2} + \phi_{i-1} \qquad (1)$$

where n is the index of the minimum valued candidate phase error.

The minimum absolute phase error on lead 803 is used to update the carrier phase and the phase shift due to ISI for that corresponding n. This phase error on lead 803 is connected to two phase-locked loops similar to the two loops in the training equalizer explained in the discussion hereinabove of FIG. 6. Thus lead 803 is connected through amplifier 804 having step size $\beta_0$ to an accumulator and integrator 805, which accumulates and integrates the error to produce the symbol independent carrier phase shift, $\theta_0$, on lead 708, and which is supplied to each of the phase error circuits 702-1–702-4 in FIG. 7. The loop formed through the phase error circuits 702-1–702-4 in FIG. 7, and in FIG. 8, decision circuit 801, amplifier 804, and accumulator 805, enables the carrier phase shift, $\theta_0$, to be continually tracked and updated, and to be independent of the transmitted symbol. Lead 803 is similarly connected to a second amplifier 806 having a step size $\beta_1$, which is connected through switch 807 to four accumulator and integrators, 808-1–808-4. Switch 807 is controlled by the index n of the minimum phase difference selected by decision circuit 801, on lead 809. The minimum absolute phase difference on lead 803 is used to update the phase shift due to ISI for that shift corresponding to the selected n. Thus switch 807 is connected to the accumulator and integrator, 808-1–808-4, that corresponds to the selected n to update the corresponding phase shift due to ISI, $\theta(n)$. The outputs $\theta(0)$, $\theta(1)$, $\theta(2)$, and $\theta(3)$, of accumulator and integrators 808-1–808-4 on leads 709-1–709-4, respectively, are connected to the corresponding phase error circuits 702-1–702-4 in FIG. 7. As with the carrier phase shift, $\theta_0$, the loops formed by these accumulator and integrators, 808-1–808-4, these phase error circuits, 702-1–702-4 (in FIG. 7), and decision circuit 801, enable the individual phase shifts due to ISI to be continually tracked and updated according the detected phase errors.

Although the technique of phase equalization described hereinabove has assumed symbol by symbol detection, the technique of phase equalization can be extended to sequence estimation by deferring decisions until the whole sequence is received and then selecting the sequence which gives the minimum MSE equal to $$\sum_{\text{sequence}} (1 - \cos\Delta\theta_i).$$

A Viterbi algorithm (see aforenoted Proakis reference) can be used to simplify the sequence estimation process. If, for example, ISI was determined to be dependent on two previous symbols, then $4^2 = 16$ phase shifts due to ISI would be estimated and each received symbol would be dependent upon the previous two symbols.

The above-described embodiments are illustrative of the principles of the present invention. Other embodiments could be devised by those skilled in the art without departing from the spirit and scope of the present invention.

What is claimed is:

1. In a TDM/TDMA digital radio communications system which transmits by a transmitter and receives by a receiver bursts of phase-shift-keyed symbols between ports and portable units over a transmission channel wherein each transmitted burst includes a segment of data symbols and an embedded training sequence segment of symbols which are known to the transmitter and the receiver and wherein the symbols in the burst are transmitted as phase angles representing the symbols, a method of detecting the transmitted symbols from the phase angles of the received signal samples in the burst comprising the steps of:

detecting the phase angles of each received signal sample in a burst;

storing the detected phase angles of the received signal samples in the burst;

processing the detected phase angles within the training sequence segment of the stored burst comprising the steps of:

comparing the detected phase angles of the received signal samples within the training sequence segment of the stored burst with the phase angles representing the known transmitted sequence of symbols; and estimating a phase shift due to intersymbol interference (ISI) for each possible phase relationship between a current transmitted symbol and at least one previously transmitted symbol from the phase comparisons between the detected phase angles within the training sequence of the stored burst and the known transmitted sequence of symbols; and processing the detected phase angles within the data segment of the stored burst comprising the steps of:

using at least one previously detected symbol to determine for each one of the possible current symbols, its expected phase angle as corrected by the phase shift due to ISI that is associated with the particular phase relationship between the possible current symbol and the at least one previously detected symbol, which phase shift due to ISI is estimated during the steps of processing the detected phase angles within the training sequence segment of the stored burst;

calculating the phase differences between the stored detected phase angle of the current symbol and the expected phase angle for each possible current symbol as each is corrected by the phase shift due to ISI; and detecting the current transmitted symbol as that one of the possible current symbols having the minimum calculated phase difference.

2. The method of claim 1 further comprising a step of updating the estimate of the phase shift due to ISI for the phase relationship between the detected current symbol and the at least one previously detected symbol from the calculated phase difference between the stored detected phase angle of the current symbol and that detected current symbol's phase-shift corrected expected phase angle.

3. In a TDM/TDMA digital radio communications system which transmits by a transmitter and receives by a receiver bursts of phase-shift-keyed symbols between ports and portable units over a transmission channel wherein each transmitted burst includes a segment of data symbols and an embedded training sequence segment of symbols which are known to the transmitter and the receiver and wherein the symbols in the burst are transmitted as phase angles representing the symbols, a method of detecting the transmitted symbols from the phase angles of the received signal samples in the burst comprising the steps of:

detecting the phase angles of each received signal sample in a burst;

storing the detected phase angles of the received signal samples in the burst;

processing the detected phase angles within the training sequence segment of the stored burst comprising the steps of:

comparing the detected phase angles of the received signal samples within the training sequence segment of the stored burst with the phase angles representing the known transmitted sequence of symbols;

estimating a phase shift due to the intersymbol interference (ISI) for each possible phase relationship between a current transmitted symbol and at least one previously transmitted symbol from the phase comparisons between the detected phase angles within the training sequence of the stored burst and the known transmitted training sequence of symbols; and estimating a carrier phase shift for the stored burst from the comparisons between the detected phase angles within the training sequence of the stored burst and the known transmitted sequence of symbols; and processing the detected phase angles within the data segment of the stored burst comprising the steps of:

using at least one previously detected symbol to determine for each one of the possible current symbols, its expected phase angle as corrected by the carrier phase shift for the burst and the phase shift to ISI that is associated with the particular phase relationship between the possible current symbol and the at least one previously detected symbol, which carrier phase shift and phase shift due to ISI are estimated during the steps of processing the detected phase angles within the training sequence segment of the stored burst;

calculating the phase differences between the stored detected phase angle of the current symbol and the expected phase angle for each possible current symbol as each is corrected by the carrier phase shift and the phase shift due to ISI; and detecting the current transmitted symbol as that one of the possible current symbols having the minimum calculated phase difference.

4. The method of claim 3 further comprising a step of updating the estimates of the carrier phase shift and the phase shift due to ISI for the phase relationship between the detected current symbol and the at least one previously detected symbol from the calculated phase difference between the stored detected phase angle of the current symbol and that detected current symbol's phase-shift corrected expected phase angle.

5. In a TDM/TDMA digital radio communications system which transmits by a transmitter and receives by a receiver bursts of phase-shift-keyed symbols between ports and portable units over a transmission channel wherein each transmitted burst includes a segment of data symbols and an embedded training sequence segment of symbols which are known to the transmitter and the receiver and wherein the symbols in the burst are transmitted as phase angles representing the symbols, apparatus in the receiver at a port or a portable unit for detecting the transmitted symbols from the phase angles of the received signal samples in the burst comprising:

means for detecting the phase angles of each received signal sample in a burst;

means for storing the detected phase angles of the received signal samples in a burst;

means for processing the detected phase angles within the training sequence segment of the stored burst comprising:

means for comparing the detected phase angles of the received signal samples within the training sequence segment of the stored burst with the phase angles representing the known transmitted sequence of symbols; and means for estimating a phase shift due to intersymbol interference (ISI) for each possible phase relationship between a current transmitted symbol and at least one previously transmitted symbol from the phase comparisons between the detected phase angles within the training sequence of the stored burst and the known transmitted sequence of symbols; and means for processing the detected phase angles within the data segment of the stored burst comprising:

means using at least one previously detected symbol for determining for each one of the possible current symbols, its expected phase angle as it is corrected by the phase shift due to ISI that is associated with the particular phase relationship between the possible current symbol and the at least one previously detected symbol, said phase shift due to ISI being estimated by said means for estimating the phase shift due to ISI;

means for calculating the phase differences between the stored detected phase angle of the current symbol and the expected phase angle for each possible current symbol as each is corrected by the phase shift due to ISI; and means for detecting the current transmitted symbol as that one of the possible current symbols having the minimum calculated phase difference.

6. Apparatus in accordance with claim 5 further comprising means for updating the estimate of phase shift due to ISI for the phase relationship between the detected current symbol and the at least one previously detected symbol from the calculated phase difference between the stored detected phase angle of the current symbol and that detected symbol's phase-shift corrected expected phase angle.

7. In a TDM/TDMA digital radio communications system which transmits by a transmitter and receives by a receiver bursts of phase-shift-keyed symbols between ports and portable units over a transmission channel wherein each transmitted burst includes a segment of data symbols and an embedded training sequence segment of symbols which are known to the transmitter and the receiver and wherein the symbols are transmitted as phase angles representing the symbols, apparatus in the receiver at a port or a portable unit for detecting the transmitted symbols from the phase angles of the received signal samples in the burst comprising:

means for detecting the phase angles of each received signal sample in a burst;

means for storing the detected phase angles of the received signal samples in the burst;

means for processing the detected phase angles within the the training sequence segment of the stored burst comprising:

means for comparing the detected phase angles of the received signal samples within the training sequence segment of the stored burst with the phase angles representing the known transmitted sequence of symbols;

means for estimating a phase shift due to intersymbol interference (ISI) for each possible relationship between a current transmitted symbol and at least one previously transmitted symbol from the phase comparisons between the detected phase angles within the training sequence of the stored burst and the known transmitted sequence of symbols; and means for estimating a carrier phase shift for the stored burst from the comparisons between the detected phase angles within the training sequence of the stored burst and the known transmitted training sequence; and means for processing the detected phase angles within the data segment of the stored burst comprising:

means using at least one previously detected symbol for determining for each one of the possible current symbols, its expected phase angle as it is corrected by the carrier phase shift and the phase shift due to ISI that is associated with the particular phase relationship between the possible current symbol and the at least one previously detected symbol, said carrier phase shift being estimated by said means for estimating a carrier phase shift and said phase shift due to ISI being estimated by said means for estimating the phase shift due to ISI;

means for calculating the phase differences between the stored detected phase angles of the current symbol and the expected phase angle for each possible current symbol as each is corrected by the carrier phase shift and the phase shift due to ISI; and means for detecting the current transmitted symbol as that one of the possible current symbols having the minimum calculated phase difference.

8. Apparatus in accordance with claim 7 further comprising means for updating the estimates of carrier phase shift and phase shift due to ISI for the phase relationship between the detected current symbol and the at least one previously detected symbol from the calculated phase difference between the stored detected phase angle of the current symbol and that detected symbol's phase-shift corrected expected phase angle.

* * * * *